US008099999B2

(12) United States Patent
Nakano

(10) Patent No.: US 8,099,999 B2
(45) Date of Patent: Jan. 24, 2012

(54) PURGE GAS CONCENTRATION ESTIMATION APPARATUS

(75) Inventor: Masaru Nakano, Sayama (JP)

(73) Assignee: Mahle Filter Systems Japan Corporation, Tokyo (JP)

(*) Notice: Subject to any disclaimer, the term of this patent is extended or adjusted under 35 U.S.C. 154(b) by 126 days.

(21) Appl. No.: 12/606,597

(22) Filed: Oct. 27, 2009

(65) Prior Publication Data

US 2010/0101311 A1 Apr. 29, 2010

(30) Foreign Application Priority Data

Oct. 28, 2008 (JP) ................................ 2008-276327

(51) Int. Cl.
*G01M 15/04* (2006.01)

(52) U.S. Cl. ................................................... 73/114.39

(58) Field of Classification Search ................ 73/114.39
See application file for complete search history.

(56) References Cited

U.S. PATENT DOCUMENTS

| | | | | |
|---|---|---|---|---|
| 5,251,592 | A * | 10/1993 | Seki et al. | 123/198 D |
| 5,429,098 | A * | 7/1995 | Tomisawa | 123/520 |
| 5,823,167 | A * | 10/1998 | Fukuchi et al. | 123/406.55 |
| 6,308,572 | B1 * | 10/2001 | Ishikawa et al. | 73/597 |
| 6,397,829 | B1 * | 6/2002 | Toyoda | 123/674 |
| 6,689,196 | B2 * | 2/2004 | Amano et al. | 96/112 |
| 6,817,346 | B2 * | 11/2004 | Konishi et al. | 123/519 |
| 7,233,845 | B2 * | 6/2007 | Veinotte | 701/29 |
| 7,326,275 | B2 * | 2/2008 | Begley | 95/14 |
| 2004/0129257 | A1 * | 7/2004 | Konishi et al. | 123/520 |
| 2004/0250796 | A1 * | 12/2004 | Veinotte | 123/520 |
| 2006/0236864 | A1 * | 10/2006 | Begley | 95/146 |

FOREIGN PATENT DOCUMENTS

| | | | |
|---|---|---|---|
| JP | 7-253037 | A | 10/1995 |
| JP | 3216276 | B2 | 8/2001 |
| JP | 2004-52661 | A | 2/2004 |

* cited by examiner

*Primary Examiner* — Freddie Kirkland, III
(74) *Attorney, Agent, or Firm* — Foley & Lardner LLP

(57) ABSTRACT

A purge gas concentration estimation apparatus has a canister having a casing that is filled with adsorbent which adsorbs and desorbs evaporated fuel and a heat capacity detection device that is disposed in the casing. The heat capacity detection device detects a heat capacity of an inside of the casing. An adsorption amount of the evaporated fuel that is adsorbed in the casing is detected from the heat capacity of the inside of the casing detected by the heat capacity detection device, and a purge gas concentration is estimated from the detected adsorption amount of the evaporated fuel.

6 Claims, 4 Drawing Sheets

PURGE GAS CONCENTRATION ESTIMATION APPARATUS

BACKGROUND OF THE INVENTION

The present invention relates to a purge gas concentration estimation apparatus.

In a vehicle using gasoline as fuel, a canister (a carbon or charcoal canister) is normally used as an evaporative fuel treatment apparatus, in order to prevent evaporated fuel in a fuel tank from discharging into the atmosphere. The canister performs the function of adsorbing and desorbing the evaporated fuel as follows: the evaporated fuel generated from the fuel tank in an engine halt state is adsorbed by an adsorbent which is made of the activated carbon. After that, by negative pressure generated by an intake of the engine, through the canister at engine start-up, an inside of the canister is purged with atmospheric air introduced from an air port. That is, the adsorbed evaporated fuel is desorbed from the adsorbent, and is burnt in the engine. The adsorbent therefore regains its adsorbing capability by the purge, and thus being able to adsorb the evaporated fuel repeatedly and properly.

Recently, emission control, i.e. control of allowable harmful or toxic gas in exhaust gas, has become increasingly restrictive. On the other hand, in areas typified by North America, laws and regulations, which require retention of large-volume evaporated fuel gas, are enforced. For this reason, an amount of the evaporated fuel gas, which is desorbed (purged) from the canister and should be burnt in the engine, is increased, and therefore an engine air-fuel ratio control has become extremely difficult and sophisticated.

Thus, normally, when starting the purge of the canister, a small quantity of purge (pre-purge) is first performed after judging whether an engine operating condition meets the purge. And an evaporated fuel amount in the purge gas is estimated from a value of variation of an emission or exhaust air-fuel ratio between presence and absence of the purge which is detected by an oxygen sensor etc. provided in an exhaust passage. Then according to the estimated evaporated fuel amount in the purge gas, a fuel injection quantity at an execution of the purge is corrected or compensated.

However, such manner requires time before the purge is executed. And besides, it is extraordinarily difficult to meet (to control) a fuel injection condition (a fuel injection quantity) from a fuel injection valve in accordance with a change of HC (hydrocarbon) concentration (concentration of the evaporated fuel) in the purge gas after starting the purge, which is profoundly affected by an evaporated fuel retention state, an evaporated fuel retention amount and so on in the canister.

For this problem, in Japanese Patent Document 1 (Patent No. 3216276), degree of saturation of the canister (a ratio of an adsorption amount of the evaporated fuel at a measurement to an adsorption amount of the evaporated fuel at saturation of canister) is calculated from an air-fuel ratio signal after the evaporated fuel purged from the canister is burnt in the engine, a canister inside temperature obtained by a temperature sensor that is built in the canister and so on. Then, from this degree of saturation, a concentration change of a purge gas concentration (a fuel concentration in the purge gas) during the purge is estimated.

Further, Japanese Patent Document 2 (Japanese Patent Provisional Publication No. 7-253037) discloses a technique of correcting a fuel injection quantity in accordance with a fuel amount (evaporated fuel) in the purge gas, which is calculated by a detection value detected by a concentration sensor that is built in the canister and a purge gas volume flow rate calculated on the basis of this detection value by the concentration sensor and an engine temperature.

SUMMARY OF THE INVENTION

In Japanese Patent Document 1, however, since the degree of saturation of the canister is calculated on the basis of the canister inside temperature and the exhaust air-fuel ratio after the evaporated fuel purged from the canister is burnt in the engine, there could arise a detection delay (a response delay) or an error caused by an effect of temperature change occurring by the purge.

On the other hand, in Japanese Patent Document 2, the fuel amount in the purge gas is detected using the built-in concentration sensor positioned inside the canister. However, with regard to the adsorbent (activated carbon) that fills the canister, in a case of low boiling point gas such as gasoline vapor, since an ambient gas concentration is saturated under a condition in which an adsorption state is beyond a certain level, an accurate adsorption state cannot be detected by the concentration sensor. For this reason, there is a problem that the fuel amount in the purge gas cannot accurately be detected.

It is therefore an object of the present invention to provide a purge gas concentration estimation apparatus which is capable of estimating the purge gas concentration instantly and accurately.

According to one aspect of the present invention, a purge gas concentration estimation apparatus comprises: a canister that has a casing filled with adsorbent which adsorbs and desorbs evaporated fuel; and a heat capacity detection device that is disposed in the casing and detects a heat capacity of an inside of the casing, and an adsorption amount of the evaporated fuel adsorbed in the casing is detected from the heat capacity of the inside of the casing, and a purge gas concentration is estimated from the detected adsorption amount of the evaporated fuel.

According to another aspect of the present invention, in the purge gas concentration estimation apparatus, the heat capacity detection device has a heating part which heats up when current is supplied to the heat capacity detection device and whose resistance changes according to its own temperature, and the heating part is supplied with a predetermined constant current and heats up, and the heat capacity of the inside of the casing is detected from a detection value of the heat capacity detection device at a point when the temperature of the heating part is stable under a condition in which the predetermined constant current is supplied to the heating part.

A detection value of the heat capacity detection device, i.e. an output voltage of the heat capacity detection device, changes according to temperature of the heating part. Further, regarding the adsorbent, the more the adsorbed HC amount (amount of the adsorbed evaporated fuel), the more the heat capacity of the adsorbent increases and the more an amount of heat that is removed from the heating part increases.

According to a further aspect of the present invention, in purge gas concentration estimation apparatus, the canister has a charge port, which is connected to a fuel tank, at one end side of a flow passage in the casing; a purge port, which is connected to an engine intake system, at the one end side of the flow passage in the casing; and an air port, which communicates with an atmosphere, at the other end side of the flow passage in the casing, and the heat capacity detection device is positioned at a position close to the one end side of the flow passage in the casing between the charge port and the purge port.

According to a still further aspect of the present invention, the purge gas concentration estimation apparatus further comprises: a temperature detection device for detecting temperature of an inside of the canister, the temperature detection device is positioned apart from the heat capacity detection device at a predetermined distance, and the heat capacity of the inside of the casing detected by the heat capacity detection device is corrected by a detection value of the temperature detection device.

According to a still further aspect of the invention, the purge gas concentration estimation apparatus further comprises: a second heat capacity detection device for detecting an adsorption amount of the evaporated fuel adsorbed in the canister from the heat capacity of the inside of the casing, and the second heat capacity detection device is positioned at the other end side of the flow passage in the casing as compared with the heat capacity detection device.

The other objects and features of this invention will become understood from the following description with reference to the accompanying drawings.

DETAILED DESCRIPTION OF THE INVENTION

Figure 1:
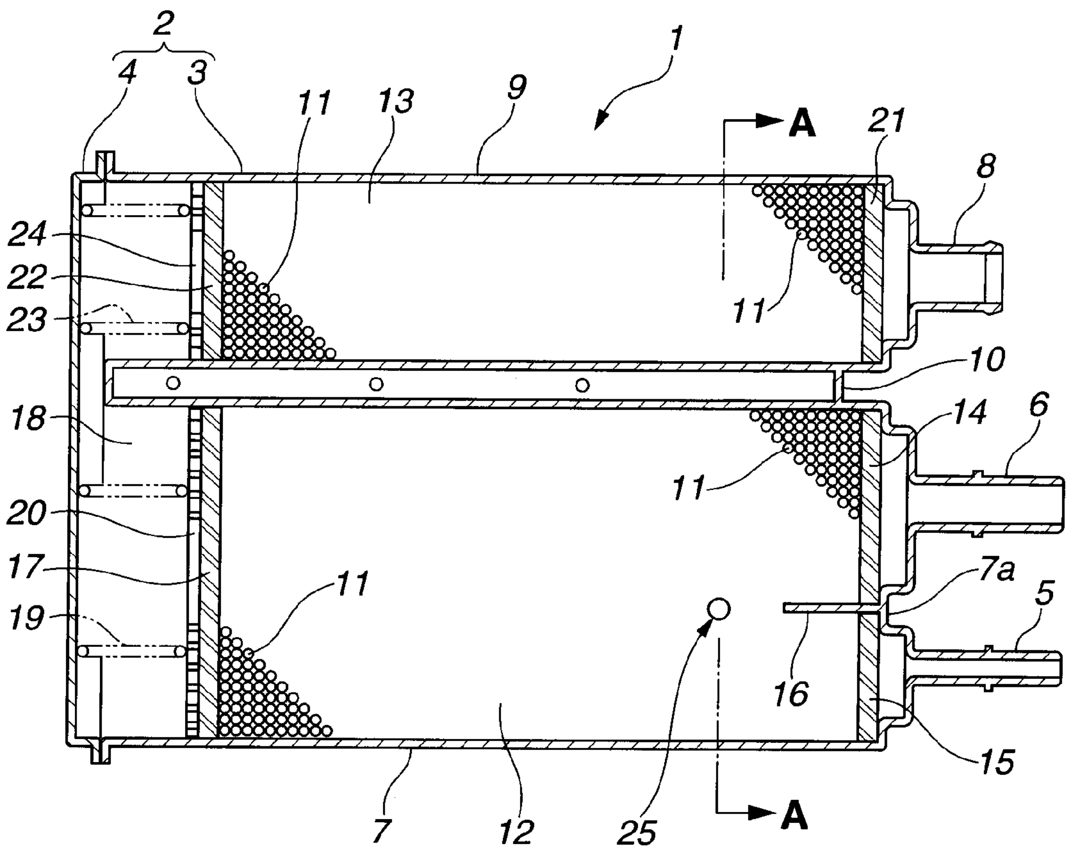
FIG. 1 is an explanation drawing showing a canister used in a purge gas concentration estimation apparatus of a first embodiment of the present invention.

A first embodiment of the present invention will be explained below with reference to the drawings. FIG. 1 shows a canister 1 used in a purge gas concentration estimation apparatus of a first embodiment of the present invention. In the following description, in FIGS. 1, 3 and 5, a right hand side of the canister 1 is termed "one end (side)", and a left hand side is termed "the other end (side)" for explanation, however, these are not to be construed as limiting terms.

A casing 2 of the canister 1 is made of synthetic resin, and is formed of a main case 3 and a cap 4. The cap 4 closes an opening of the other end of the main case 3 that is formed longitudinally. The main case 3 has a first cylindrical portion 7 and a second cylindrical portion 9, both of which are formed longitudinally and substantially cylindrical in shape. At one side of the first cylindrical portion 7, a purge port 5 connected to an inlet or intake system (or inlet or intake side) of an engine (not shown), and a charge port 6 connected to a fuel tank (not shown), are provided adjacently to each other. At one side of the second cylindrical portion 9, an air port 8 (or an atmosphere port 8) communicating with the atmosphere is provided. Both the other ends of the first and second cylindrical portions 7 and 9 are opened, and covered with the cap 4.

These first cylindrical portion 7 and second cylindrical portion 9 are disposed so that they are adjacent to each other. And further, they are connected to each other by a stiffening rib 10. Then, shape of the main case 3 is substantially rectangular parallelepiped like a box.

In the first and second cylindrical portions 7 and 9, a first filling chamber 12 and a second filling chamber 13 are respectively formed longitudinally. Further, both of the first and second filling chambers 12 and 13 are filled with an activated carbon or charcoal 11 as an adsorbent that adsorbs and desorbs evaporated fuel (or evaporative fuel).

The first filling chamber 12 communicates with the charge port 6 via a first porous screen member 14, and also communicates with the purge port 5 via a second porous screen member 15, at one side of the first filling chamber 12. The first and second screen member 14 and 15 are partitioned by a partition wall 16 that protrudes from one side wall surface **7*a* of the first cylindrical portion 7 toward the other side (left hand side in FIG. 1) of the first cylindrical portion 7 in the first filling chamber 12**.

On the other hand, at the other side of the first filling chamber 12, the first filling chamber 12 communicates with a communication passage 18 that is defined by the other end portion (left side portion in FIG. 1) of the main case 3 and the cap 4, via a third porous screen member 17. The third screen member 17 is urged toward one side (right hand side in FIG. 1) of the first filling chamber 12 by a first perforated plate or panel 20 which receives a spring force of a first spring 19.

As for the second filling chamber 13, the second filling chamber 13 communicates with the air port 8 via a fourth porous screen member 21 at one side (right hand side in FIG. 1) of the second filling chamber 13, while the second filling chamber 13 communicates with the communication passage 18 via a fifth porous screen member 22 at the other side (left side portion in FIG. 1) of the second filling chamber 13. The fifth screen member 22 is urged toward one side of the second filling chamber 13 by a second perforated plate or panel 24 which receives a spring force of a second spring 23.

The first and second filling chambers 12 and 13 communicate with each other via the communication passage 18 at the other sides of the first and second filling chambers 12 and 13. The first and second filling chambers 12 and 13 and the communication passage 18 therefore form a flow passage whose shape is a U-shaped structure inside the casing 2 and in which a purge air and the evaporated fuel etc. turn at the communication passage 18. That is, the canister 1 has a structure in which the charge port 6 and the purge port 5 are disposed at one end side of the flow passage in the casing 2 and also the air port 8 is disposed at the other end side of this flow passage.

With respect to the screen members 14, 15, 17, 21 and 22, each of them is made of urethane or nonwoven fabric, and has the function of preventing the activated carbon 11 of the adsorbent from falling out, and of holding or retaining the activated carbon 11.

As shown in FIG. 1, a hot-wire sensor 25 as a heat capacity detection means or device is provided near the one side of the first filling chamber 12 between the charge port 6 and the purge port 5. More specifically, the hot-wire sensor 25 is positioned at a position where a relatively good amount of evaporated fuel is adsorbed in the casing 2, namely that the hot-wire sensor 25 is positioned at a position closed to the one end side of the flow passage in the casing 2 between the charge port 6 and the purge port 5.

Figure 2:
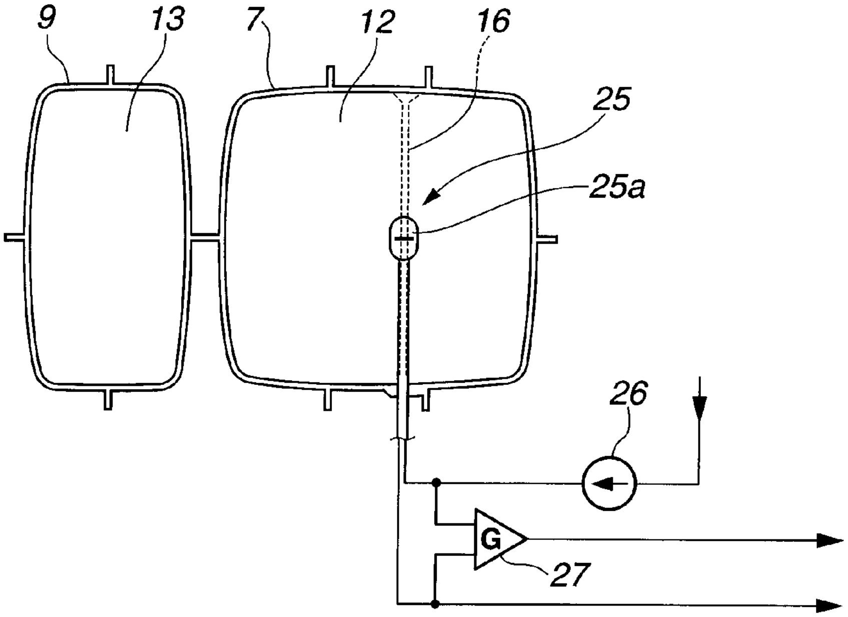
FIG. 2 is an explanation drawing showing a sectional view taken along a plane A-A of FIG. 1 together with a detection circuit of a hot-wire sensor.

As explained in more detail, as can be seen in FIG. 2, the hot-wire sensor 25 has a heating part **25*a* which heats up when current is passed through the hot-wire sensor 25 and whose resistance changes according to its own temperature. The heating part 25***a* is formed from a material whose resistance increases with increase in its temperature, and is supplied with a predetermined constant current by a constant-current source 26. The constant-current source 26 supplies the constant current to the hot-wire sensor 25 even if the engine is not started, when a key position is at an ACC position where power is supplied to vehicle electrical components through a driver's key operation.

An output voltage of the hot-wire sensor 25, which is a detection value of the hot-wire sensor 25, is measured through an amplifier (preamplifier) 27, then the detection value is inputted to a control unit (not shown) for estimating a purge gas concentration. More specifically, the control unit performs computation of the detection value of the hot-wire sensor 25, and the purge gas concentration that is a fuel concentration in a purge gas (gas flowing into the engine intake system from the purge port 5) is estimated before the engine start.

The heating part 25*a* of the hot-wire sensor 25 becomes a constant temperature (stable temperature) through heat conduction or heat transfer from a periphery of the heating part 25*a* to the activated carbon 11 in a state in which there is no large flow such as the purge and refueling in the canister 1. Regarding the activated carbon 11, the more the activated carbon 11 adsorbs HC (hydrocarbon) that is the evaporated fuel, the more the heat capacity of the activated carbon 11 increases. That is, the more the HC adsorption amount of the activated carbon 11 increases, i.e. the larger the amount of the evaporated fuel existing in the canister 1, the lower the stable temperature of the heating part 25*a* becomes and the lower (smaller) the resistance of the heating part 25*a* becomes. Therefore, by measuring or detecting the output voltage that is the detection value of the hot-wire sensor 25 through the amplifier (preamplifier) 27 (by detecting the detection value of the hot-wire sensor 25 at a point when the temperature of the heating part 25*a* is stable under the condition in which the predetermined constant current is supplied to the hot-wire sensor 25), the heat capacity of the activated carbon 11 around the heating part 25*a*, i.e. around the hot-wire sensor 25, can be detected.

Then, from the heat capacity of the activated carbon 11 around the hot-wire sensor 25, the adsorption amount of the evaporated fuel of the activated carbon 11 around the hot-wire sensor 25 is detected. As described above, since the larger the heat capacity of the activated carbon 11, the larger the adsorption amount of the evaporated fuel of the activated carbon 11, it is possible to detect the adsorption amount of the evaporated fuel of the activated carbon 11 from the heat capacity of the activated carbon 11. Here, the hot-wire sensor 25 detects the adsorption amount of the evaporated fuel adsorbed in the casing 2 from the heat capacity. Thus, even if the HC adsorption amount of the activated carbon 11 exceeds a certain amount and is saturated, it is possible to accurately detect the adsorption amount of the evaporated fuel adsorbed in the casing 2.

Further, from the adsorption amount of the evaporated fuel of the activated carbon 11, the purge gas concentration is estimated. The purge gas concentration is calculated using a purge gas concentration calculation map (not shown) that is stored in a ROM in the control unit. The purge gas concentration calculation map is data that has a relationship between the purge gas concentration and the adsorption amount of the evaporated fuel of the activated carbon 11, which shows a characteristic in which the larger the adsorption amount of the evaporated fuel of the activated carbon 11, the higher the purge gas concentration becomes.

Here, in the present invention, the adsorption amount of the evaporated fuel of the activated carbon 11 is calculated using an adsorption amount calculation map (not shown) that is stored in the ROM in the control unit. The adsorption amount calculation map is data that has a relationship between the output voltage of the hot-wire sensor 25 detected through the amplifier 27 and the adsorption amount of the evaporated fuel of the activated carbon 11. More specifically, in a case where the heating part 25*a* is formed from the material whose resistance increases with increase in its temperature, the adsorption amount calculation map is set so that the higher the output voltage of the hot-wire sensor 25, the less the adsorption amount of the evaporated fuel of the activated carbon 11 becomes. On the other hand, in a case where the heating part 25*a* is formed from a material whose resistance decreases with increase in its temperature, the adsorption amount calculation map is set so that the higher the output voltage of the hot-wire sensor 25, the more the adsorption amount of the evaporated fuel of the activated carbon 11 becomes.

As explained above, in the first embodiment, by detecting the heat capacity of an inside of the casing 2, namely the heat capacity of the activated carbon 11, the HC adsorption amount of the activated carbon 11 can be directly detected. With this detection, by using the HC adsorption amount (adsorption amount of the evaporated fuel) of the activated carbon 11, which is detected through the current energization before the engine start, irrespective of the HC adsorption amount of the adsorbent, it is possible to instantly and accurately estimate the purge gas concentration that is the fuel concentration in the purge gas upon execution of the purge.

Further, by employing the hot-wire sensor 25, the HC adsorption amount in the canister 1 can be directly detected with a less expensive system.

Moreover, by placing the hot-wire sensor 25 near or close to the purge port 5 in the canister 1, i.e. at the position where the adsorption amount of the evaporated fuel is large in the canister 1, the purge gas concentration upon execution of the purge can be estimated more accurately.

In the following, other embodiments of the present invention will be explained. The same components or parts as the first embodiment are denoted by the same reference numbers, and explanations of these components are omitted here.

Figure 3:
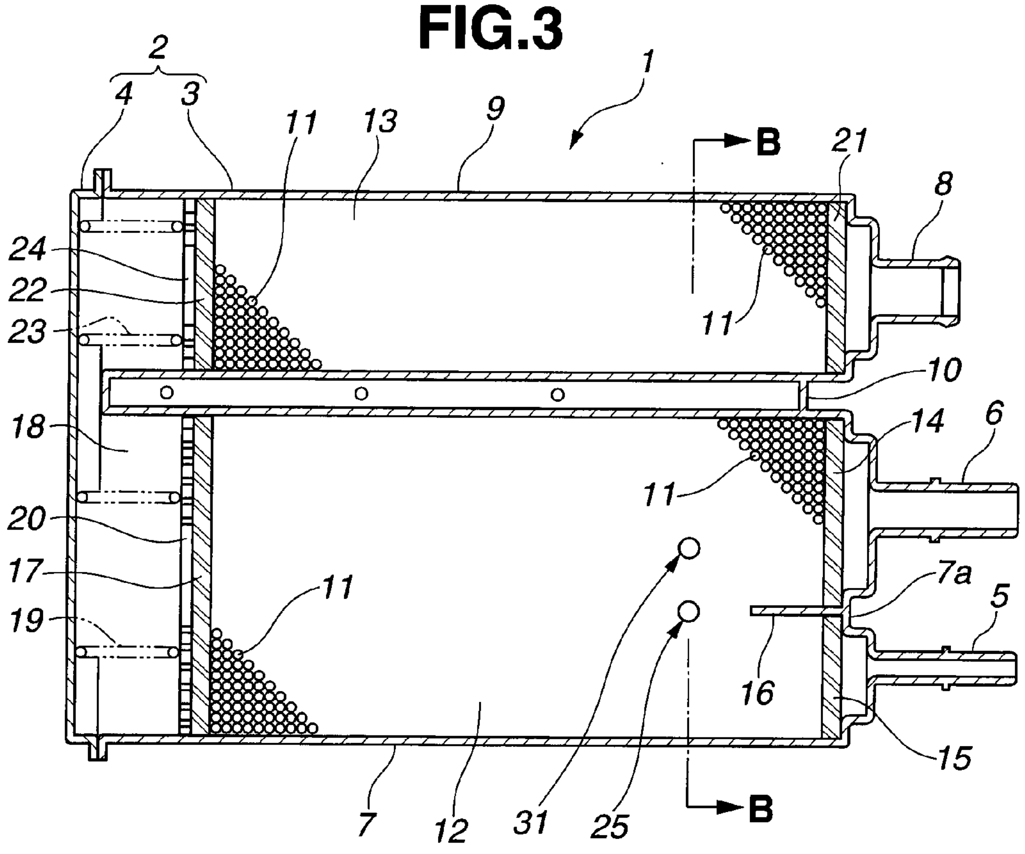
FIG. 3 is an explanation drawing showing a canister used in a purge gas concentration estimation apparatus of a second embodiment.

A second embodiment will be explained with reference to FIGS. 3 and 4. The structure of the second embodiment is basically same as the first embodiment. However, in the first filling chamber 12, a temperature sensor 31 as a temperature detection means or device for detecting a temperature of an inside of the canister 1 is provided. As shown in FIG. 3, the temperature sensor 31 is positioned apart from the hot-wire sensor 25 at a predetermined distance.

Figure 4:
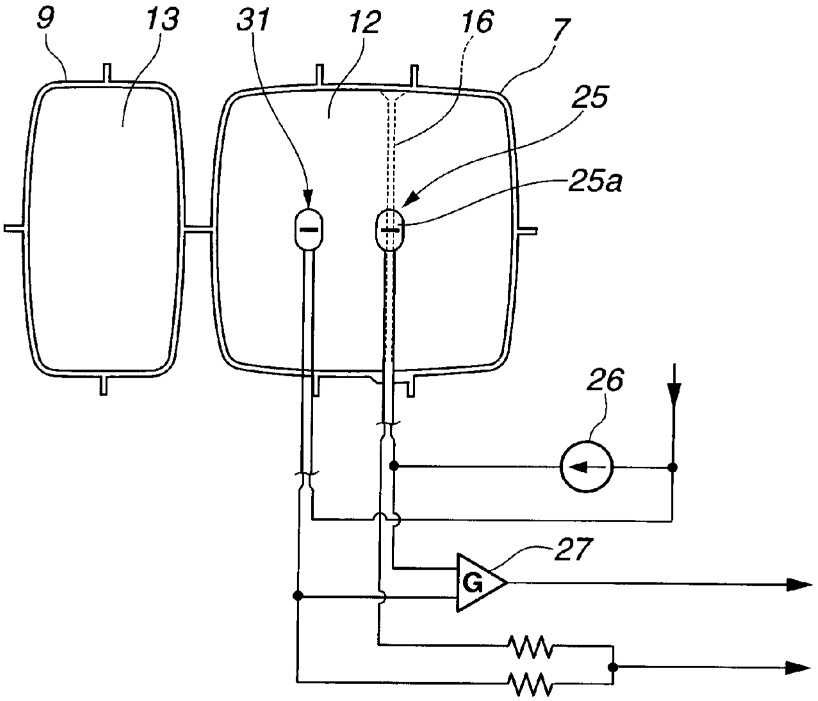
FIG. 4 is an explanation drawing showing a sectional view taken along a plane B-B of FIG. 3 together with a detection circuit of a hot-wire sensor.

Also in the second embodiment, as shown in FIG. 4, the hot-wire sensor 25 is supplied with the constant current from the constant-current source 26. On the other hand, the temperature sensor 31 is supplied with a sufficiently smaller current than the current of the hot-wire sensor 25, not through the constant-current source 26, then the temperature sensor 31 works with almost no heat generation. The temperature sensor 31 and the hot-wire sensor 25 form a so-called bridge circuit, and a value of difference between the temperature sensor 31 and the hot-wire sensor 25 is detected through the amplifier 27. That is, in this second embodiment, an output value of the hot-wire sensor 25 is corrected or compensated by or with an output value of the temperature sensor 31.

With regard to the method of estimating the purge gas concentration using output value of the hot-wire sensor 25 detected through the amplifier 27, it is the same as the first embodiment.

In the second embodiment, in addition to functions and effects obtained in the first embodiment, by correcting or compensating the output value of the hot-wire sensor 25 by or with the output value of the temperature sensor 31, the heat capacity of the inside of the casing 2, i.e. the heat capacity of the activated carbon 11 can be detected with consideration given to an ambient temperature (temperature of the activated carbon 11). Thus the HC adsorption amount of the activated carbon 11 can be detected even more accurately.

Furthermore, from a change of the ambient temperature (temperature change of the activated carbon 11) during the purge, the accurate estimation of the purge gas concentration during the purge can be performed.

In the second embodiment, although the temperature sensor 31 is positioned apart from the hot-wire sensor 25 at the predetermined distance, this predetermined distance means that the temperature sensor 31 is disposed apart from the hot-wire sensor 25 at such distance that the temperature sensor 31 is unaffected by an influence of heat (heat generation) of the hot-wire sensor 25. The predetermined distance could be properly set in accordance with a magnitude of the constant current supplied to the hot-wire sensor 25 and/or material of the heating part 25*a*.

Figure 5:
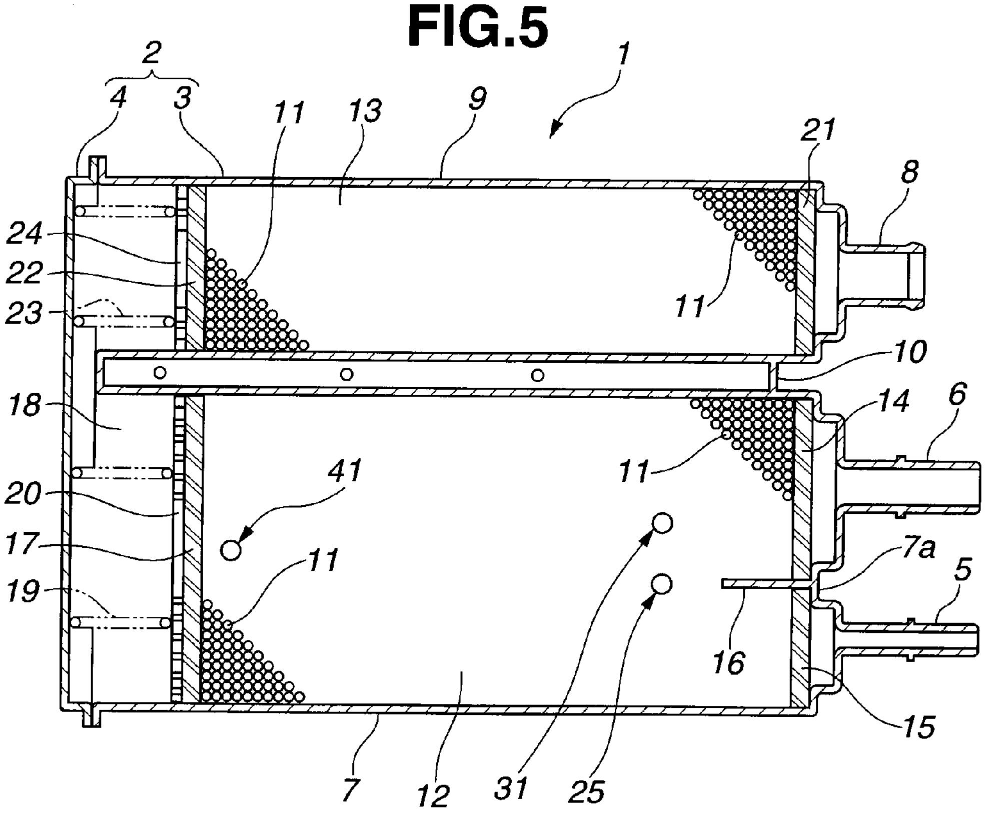
FIG. 5 is an explanation drawing showing a canister used in a purge gas concentration estimation apparatus of a third embodiment.

Next, a third embodiment will be explained with reference to FIG. 5. The structure of the third embodiment is basically same as the second embodiment. However, as can be seen in FIG. 5, a hot-wire sensor 41 as a second heat capacity detection means or device is provided and positioned at the other side of the first filling chamber 12. In other words, the hot-wire sensor 41 is located at the other end side of the flow passage in the casing 2 as compared with the hot-wire sensor 25. The hot-wire sensor 41 detects the adsorption amount of the evaporated fuel adsorbed in the canister 1 from the heat capacity of the inside of the casing 2.

In the third embodiment, in addition to functions and effects obtained in the second embodiment, degree of saturation of the canister 1 (a ratio of the adsorption amount of the evaporated fuel at the measurement to the adsorption amount of the evaporated fuel at the saturation of the canister 1) can be accurately detected from the adsorption amount of the evaporated fuel detected by the hot-wire sensor 41, and the purge gas concentration during the purge can be accurately detected. That is to say, by detecting the adsorption amount of the evaporated fuel at two positions of one end side and the other end side of the flow passage in the casing 2, the degree of saturation of the canister 1, which changes during the purge, can be accurately detected.

In the third embodiment, the detection value of the hot-wire sensor 25 is detected by the same detection circuit as FIG. 4, and the detection value of the hot-wire sensor 41 is detected by the same detection circuit as FIG. 2. In addition, regarding the method of detecting the purge gas concentration from the detection value of the hot-wire sensor 41, it is the same as the above-mentioned method of estimating the purge gas concentration through the hot-wire sensor 25.

Figure 6:
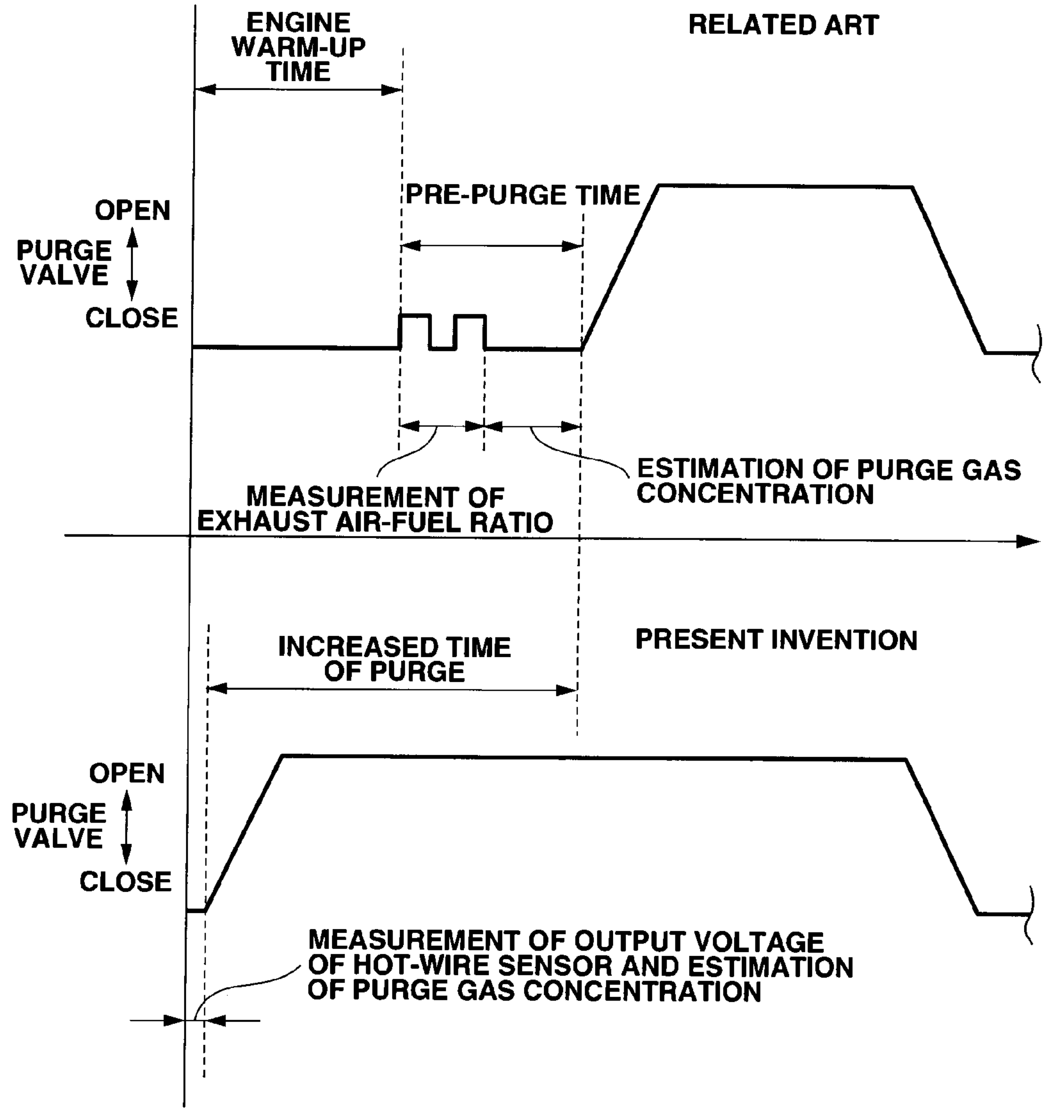
FIG. 6 is a drawing that explains comparison between a purge time by a purge gas concentration estimation of the present invention and a purge time by a purge gas concentration estimation of a related art in which a pre-purge is performed before the purge.

Furthermore, as described in each embodiment, when it becomes possible to accurately estimate the purge gas concentration upon execution of the purge before the engine start, the purge of the canister 1 can be executed without performing a so-called pre-purge (see FIG. 6. a related art requires the pre-purge for measurement of an exhaust air-fuel ratio and estimation of the purge gas concentration to determine a fuel injection quantity, whereas the present invention requires no pre-purge.). Therefore a purge-executable time of the canister 1 can be relatively increased or lengthened, and the evaporated fuel of the canister 1 can be instantly purged.

This will be explained in more detail. When executing the purge of the canister 1, since the evaporated fuel of the canister 1 is introduced or flows into the engine intake system, there is a need to correct or compensate the fuel injection quantity that is injected from a fuel injection valve (not shown) in accordance with the purge gas concentration. Because of this, as previously mentioned above, normally, when starting the purge of the canister, a small quantity of purge (pre-purge) is first performed with a purge valve open a little after judging whether an engine operating condition meets the purge (e.g. judging whether engine-warm up is completed). And an evaporated fuel amount in the purge gas is estimated from a value of variation of the exhaust air-fuel ratio between presence and absence of the small quantity of purge which is detected by an oxygen sensor etc. provided in an exhaust passage. Then, the purge is executed with the purge valve open wide (e.g. full-throttle) after this estimation (see an upper drawing in FIG. 6).

The reason why this procedure or operation in the related art is carried out is that if the fuel injection quantity is not corrected in accordance with the estimated evaporated fuel amount in the purge gas during the purge execution, there is a possibility that exhaust performance will be deteriorated and harmful or toxic gas in exhaust gas will be increased. For this reason, as compared with the above each embodiment, the purge-executable time of the canister relatively becomes short, then the evaporated fuel of the canister cannot be instantly purged. In the above description, the purge valve is a valve that is installed at some midpoint inside a pipe which connects the purge port of the canister and the engine intake system.

From the foregoing, the present invention gains the advantages and effects as follows.

By detecting the heat capacity of the inside of the casing, i.e. the heat capacity of the adsorbent, the HC adsorption amount of the adsorbent (adsorption amount of the evaporated fuel) can be directly detected. With this detection, by using the HC adsorption amount of the adsorbent, which is detected through the current energization before the engine start, irrespective of the HC adsorption amount of the adsorbent, it is possible to instantly and accurately estimate the purge gas concentration that is the fuel concentration in the purge gas upon execution of the purge.

Further, by supplying the predetermined constant current to the heating part, the heating part heats up, and by detecting the heat capacity of the inside of the casing from the detection value of the heat capacity detection device at the point when the temperature of the heating part is stable under the condition in which the predetermined constant current is supplied to the heating part, the HC adsorption amount of the adsorbent can be directly detected with the less expensive system.

Furthermore, in the present invention, the heat capacity detection device is positioned at the position where the relatively good amount of evaporated fuel is adsorbed in the casing, namely that the heat capacity detection device is positioned at the position closed to the one end side of the flow passage in the casing between the charge port and the purge port. Thus the purge gas concentration upon execution of the purge can be detected more accurately.

Moreover, by providing the temperature detection device detecting the temperature of the inside of the canister with the temperature detection device apart from the heat capacity detection device at the predetermined distance, the heat capacity of the inside of the casing, i.e. the heat capacity of the adsorbent can be detected with consideration given to the ambient temperature (temperature of the adsorbent). Thus the HC adsorption amount of the adsorbent can be detected even more accurately. In addition, from the change of the ambient temperature (temperature change of the adsorbent) during the purge, the accurate estimation of the purge gas concentration during the purge can be performed.

In the present invention, the second heat capacity detection device is provided at the other end side of the flow passage in the casing as compared with the heat capacity detection device. Therefore, the degree of saturation of the canister (the ratio of the adsorption amount of the evaporated fuel at the measurement to the adsorption amount of the evaporated fuel at the saturation of the canister) can be accurately detected, and the purge gas concentration during the purge can be accurately detected.

The entire contents of Japanese Patent Application No. 2008-276327 filed on Oct. 28, 2008 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A purge gas concentration estimation apparatus comprising:

a canister that has a casing filled with adsorbent which adsorbs and desorbs evaporated fuel; and a heat capacity detection device that is disposed in the casing and detects a heat capacity of an inside of the casing, and an adsorption amount of the evaporated fuel adsorbed in the casing being detected from the heat capacity of the inside of the casing, and a purge gas concentration being estimated from the detected adsorption amount of the evaporated fuel.

2. The purge gas concentration estimation apparatus as claimed in claim 1, wherein:

the heat capacity detection device has a heating part which heats up when current is supplied to the heat capacity detection device and whose resistance changes according to its own temperature, and the heating part is supplied with a predetermined constant current and heats up, and the heat capacity of the inside of the casing is detected from a detection value of the heat capacity detection device at a point when the temperature of the heating part is stable under a condition in which the predetermined constant current is supplied to the heating part.

3. The purge gas concentration estimation apparatus as claimed in claim 1, wherein:

the canister has a charge port, which is connected to a fuel tank, at one end side of a flow passage in the casing;

a purge port, which is connected to an engine intake system, at the one end side of the flow passage in the casing; and an air port, which communicates with an atmosphere, at the other end side of the flow passage in the casing, and the heat capacity detection device is positioned at a position close to the one end side of the flow passage in the casing between the charge port and the purge port.

4. The purge gas concentration estimation apparatus as claimed in claim 3, further comprising:

a second heat capacity detection device for detecting an adsorption amount of the evaporated fuel adsorbed in the canister from the heat capacity of the inside of the casing, and wherein the second heat capacity detection device is positioned at the other end side of the flow passage in the casing as compared with the heat capacity detection device.

5. The purge gas concentration estimation apparatus as claimed in claim 1, further comprising:

a temperature detection device for detecting temperature of an inside of the canister, the temperature detection device being positioned apart from the heat capacity detection device at a predetermined distance, and wherein the heat capacity of the inside of the casing detected by the heat capacity detection device is corrected by a detection value of the temperature detection device.

6. The purge gas concentration estimation apparatus as claimed in claim 5, wherein:

the predetermined distance is a distance such that the temperature detection device is unaffected by an influence of heat of the heat capacity detection device.

* * * * *